(12) United States Patent
Amir

(10) Patent No.: US 8,633,806 B2
(45) Date of Patent: Jan. 21, 2014

(54) TWO DIRECTIONAL INFORMATION FLOW IN REAL TIME LOCATION SENSING RFID NETWORKS

(75) Inventor: Israel Amir, Princeton, NJ (US)

(73) Assignee: Centrak, Newtown, PA (US)

( * ) Notice: Subject to any disclaimer, the term of this patent is extended or adjusted under 35 U.S.C. 154(b) by 430 days.

(21) Appl. No.: 13/034,741

(22) Filed: Feb. 25, 2011

(65) Prior Publication Data

US 2011/0140861 A1 Jun. 16, 2011

Related U.S. Application Data

(63) Continuation-in-part of application No. 11/881,631, filed on Jul. 27, 2007, now abandoned.

(51) Int. Cl.
*H04Q 5/22* (2006.01)

(52) U.S. Cl.
USPC ..... 340/10.2; 340/10.1; 340/10.31; 340/10.4; 340/9.1; 340/9.14

(58) Field of Classification Search
USPC ................ 340/3.2, 3.21, 825.2, 825.21, 10.2, 340/10.1, 10.31, 10.4, 9.1, 9.14
See application file for complete search history.

(56) References Cited

U.S. PATENT DOCUMENTS

| | | | |
|---|---|---|---|
| 5,887,176 A * | 3/1999 | Griffith et al. | 713/320 |
| 6,034,603 A * | 3/2000 | Steeves | 340/10.2 |
| 6,804,578 B1 * | 10/2004 | Ghaffari | 700/229 |
| 6,982,646 B2 | 1/2006 | Rodgers et al. | |
| 7,049,933 B1 | 5/2006 | Koerner | |
| 7,604,178 B2 * | 10/2009 | Stewart | 235/492 |
| 2005/0093679 A1 * | 5/2005 | Zai et al. | 340/10.2 |
| 2006/0022801 A1 * | 2/2006 | Husak et al. | 340/10.5 |
| 2006/0163349 A1 * | 7/2006 | Neugebauer | 235/383 |
| 2007/0055470 A1 * | 3/2007 | Pietrzyk et al. | 702/104 |
| 2007/0279228 A1 * | 12/2007 | Morris et al. | 340/572.1 |
| 2008/0019461 A1 * | 1/2008 | Rabbachin et al. | 375/316 |
| 2008/0186136 A1 * | 8/2008 | Raphaeli et al. | 340/10.1 |

* cited by examiner

*Primary Examiner* — Andrew Bee

(57) ABSTRACT

An RFID system with a plurality of tags and base stations where transmission of information to a specific tag is carried out by one of the base stations, where said one of the base stations is selected based on received signal power of the tag relative to the plurality of the base stations.

10 Claims, 3 Drawing Sheets

TWO DIRECTIONAL INFORMATION FLOW IN REAL TIME LOCATION SENSING RFID NETWORKS

RELATED APPLICATION

This application is a continuation in part of, and claims priority from, U.S. patent application Ser. No. 11/881,631, filed Jul. 27, 2007 now abandoned.

BACKGROUND OF THE INVENTION

This invention relates to RFID tags and, more particularly, to communication of information to tags in the context of a network having a plurality of base stations.

Typical applications of RFID tags pertain to a need to determine the locations of items. An RFID tag is attached to the item, and the location of the item with the attached tag is determined by the use of base stations. Two basic RFID system approaches are used: synchronous, and asynchronous.

A synchronous system employs a system clock, and all base stations and tags are synchronized to the system clock. In some applications time is divided into frames, and each frame has two sub-frames. The first sub-frame is divided into K time slots, during each of which a different one of the base stations may broadcast information to the tags within its range; and the second sub-frame is divided into N time slots, during each of which a different one of the tags transmits information, and all base stations listen. N is the expected maximum number of tags that the system will handle, and K is the number of base stations. The timing is achieved by, illustratively, adding an additional time interval during which beacon signals are transmitted by the base stations and are used by the tags for synchronizing themselves to the system clock. That is, at the beginning of each frame there is a beacon time interval, and the base stations employ this time interval to each send out a synchronizing beacon. This is illustrated by the FIG. 1 timing diagram for an arrangement where N=8 and K=4.

An asynchronous system is one where the tags attempt to send information periodically, but there is no synchronization between the tags and other elements of the system.

Thus, regardless of whether a synchronous system is implemented, or an asynchronous system is implemented, the result is the same in the sense that each tag repetitively transmits information about itself, and the transmitted signal is received by one or more (it is hoped) of the base-stations. Based on the received signal power, or on time-of-flight information, the network of base stations determines, or rather estimates, the location of the tag (and, consequently, the item to which the tag is attached). It may be noted that in a co-pending application, titled "Dual Antenna Base Station for Improved RFID Localization," and filed on even date herewith, the base stations use directional antenna arrangements that allow for easy determination of tag location by using simple comparison operations.

In a variant of the above approach a tag "listens" to synchronized beacon signals from the different base stations and, using the incoming power information of the received signals in conjunction with the known base station locations, the tag estimates its location (by use of a triangulation technique) and transmits this estimate.

One of the problems of prior art RFID networks is that they lack the ability for the base stations to transmit data that is destined only to a particular tag. The main difficulty stems from the fact that in prior art networks all of the base stations either listen to the tags, or broadcast to all tags; and when they broadcast, they do so other than concurrently, because transmitting concurrently may create "blind spots" that arise from overlapping and destructively combining transmissions.

SUMMARY OF THE INVENTION

An advance in the art is achieved by introducing the ability to transmit information to a specific tag or tags, and by having only one base station transmit to a particular tag. The selection of a base station for this task of transmitting is based on the location of the tag, or effectively on the location of the tag, relative to the set of base stations. Illustratively, the base station that is chosen is the base station that is determined to be closest to the tag, or the base station that receives the strongest signal from the tag. The choice is made by a processor that communicates with the various base stations.

In a synchronous system a time interval that is devoted to a tag is illustratively divided into a transmitting mini-time slot and a receiving mini-time slot. During the transmitting mini-time slot the base station transmits the information it needs to transmit to the tag, and during the receiving mini-time slot the base station receives information from the tag. When the information that needs to be communicated to the tag is larger than what a mini-time slot can handle, the information is chunked into portions and the portions are transmitted in successive frames. In an asynchronous system, a tag transmits when it desires, and the base station determines whether the transmission is successful or is corrupted by, for example, a collision with another tag. Advantageously, in the course of transmitting whatever information the tag needs to transmit, the tag includes an acknowledgement to report on whether transmission to it was successful.

DETAILED DESCRIPTION

Figure 2:
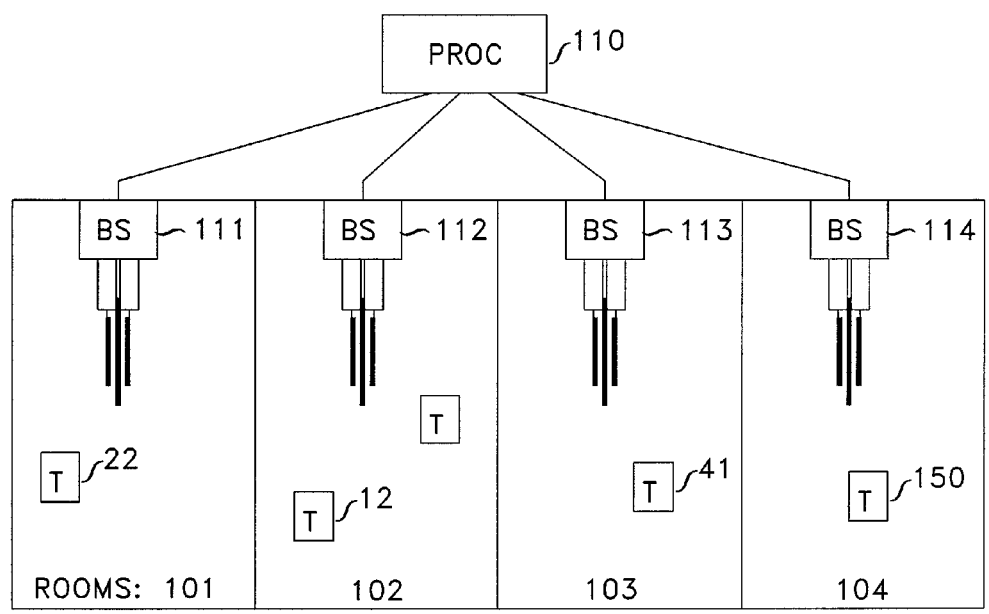
FIG. 2 is a block diagram of such a system where tags can be located in any one of four different rooms of a building.

FIG. 2 depicts one illustrative embodiment of system to which the principles disclosed herein may be applied. It is a building with rooms 101, 102, 103, and 104, and a base station close to the right wall of rooms 101, 102, and 103; that is, base stations 111, 112, and 113. Each of the base stations has an antenna arrangement with two directional antennas that are directed at different directions and, thus, each base station outputs two signals that correspond to signals received from different directions. Under the assumption that a tag, such as tag 22, is in one of the rooms, the location of the tag is determined by an initial comparison within each base station of received power of the two signals so as to resolve the direction from which the tag is transmitting, followed by a determination (in a central controller such as processor 110) of a simple logical relationship between the directions resolved by the individual base stations.

One of the attributes of the FIG. 2 arrangement is that it is simple to determine the base station, and the particular directional antenna, that receives the signal of a given tag with the largest received power. To illustrate, when a tag is located in room 102 it is likely that the maximum power will be received either by the antenna of base station 111 that is directed to the right, or by the antenna of base station 112 that is directed to the left. Consequently it is quite simple to identify the room where the tag is located or, for example to identify the antenna that receives the most power.

Whether processor 110 identifies a particular base station as best suited for transmitting information to a particular tag based on the location of the tag, or based simply on received power, or based on some other criterion, the point to note is that processor 110 identifies a base station that is best suited for transmitting information to a tag, and assigns the task of transmitting to that identified base station. Illustratively, each of the base stations sends the received power information to processor 110, processor 110 determines the antenna with the highest received power, and assigns to that antenna the task of transmitting information to that particular tag in the next frame; that is, if there is information to be communicated.

In another illustrative embodiment, the base station that is assigned the task of transmitting information to a tag is the base station that is closest to the tag is some selected sense. For example, in the FIG. 2 arrangement where there are a number of rooms, and each room other than the last has one base station, the base station that transmits to a tag is the base station that is present in the room where the tag is estimated to be; for example, a tag that is in room 102 receives information from base station 112.

Viewed conversely, every base station has an assigned list of zero to K tags for which the base station is responsible (where K is the number of tags that the system is handling), but this assignment may change from time to time, based on the conditions in the building; such as a tag moving from one room to another.

Active RFID systems operate on the premise that low power consumption by the tags is of paramount importance and, therefore, a tags is powered down almost to zero, or made to "sleep," at all times except when the tag wishes to transmit information; and in the context of this disclosure, a tag is asleep at all times except when it wishes to transmit information or it expects to receive information. Two types of systems are typically employed that conform to the above: synchronous systems and asynchronous systems. For both types of systems, however, only one base station is assigned the task of communicating with each tag that is detected by the system.

Synchronous System

Figure 3:
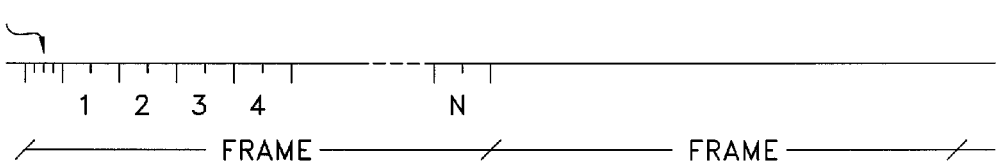
FIG. 3 presents another timing diagram from a synchronous real time location sensing FRID system that is well suited for transmitting information to a specified tag by using a single base station.

One timing schema that is advantageous for this arrangement is to have processor 110 periodically provide a synchronizing signal to all of the base stations, and to have each base station output a beacon that, inter alia, specifies the delay of that beacon signal relative to the synchronizing signal of processor 110. Thus, for example, the beacon signal of a first base station may "state" that it is being transmitted 1 ms after the synchronizing signal, the beacon signal of a second base station may "state" that it is being transmitted 8 ms after the synchronizing signal, etc. FIG. 3 depicts an illustrative timing diagram where all of the beacons follow each other in close proximity and following the beacon signals, the frame is divided into N time intervals with each time interval itself being divided into a receive portion followed by a transmit portion (not shown). During the receive portion of time slot j a tag that is assigned to time slot j receives information that is transmitted by the base station that is assigned the task of communicating with that tag, and during the transmit portion the tag transmits information about itself, including an acknowledgement about the receipt of information during the preceding interval. The information that is received contains, for example, an error detecting code, and the information that the tag transmits is an acknowledgement (based on assessment of the received information relative to the error detecting code) that the information arrived intact.

Given that a tag has a specified time slot in with a predetermined duration it is possible that the information that needs to be communicated to the tag exceeds the available duration of the time slot. In such a circumstance, that message is broken up into chunks, and the chunks are transmitted in successive frames. If a transmission of a chunk fails, the base station resends the chunk until it is received successfully; and clearly, if the tag is moved to a new location, the next transmission to the tag may occur from a different base station.

Figure 1:
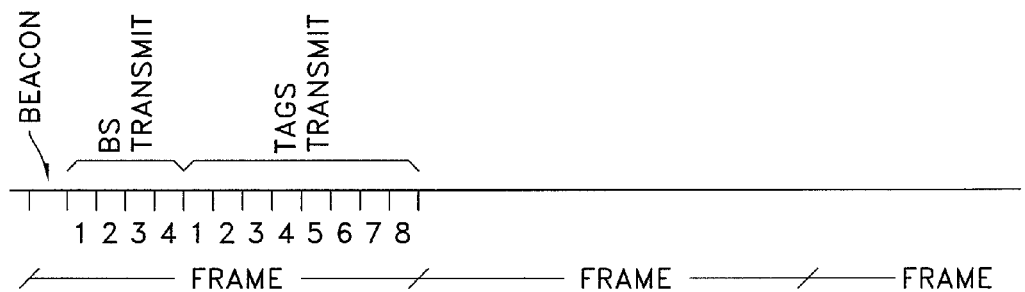
FIG. 1 presents a timing diagram of a synchronous real time location sensing RFID system.
Figure 4:
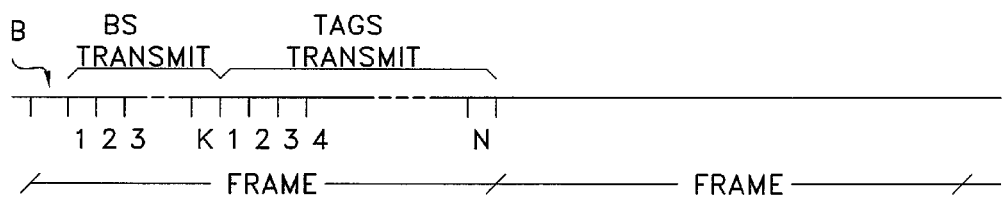
FIG. 4 presents yet another timing diagram where a first sub-frame is devoted to transmissions to tags while a second sub-frame is devoted to transmissions by the tags.

FIG. 4 presents yet another timing diagram, where a frame is divided into two sub-frames (not counting the beacons transmission interval), where the first sub-frame is devoted to transmissions to tags, while the second sub-frame is devoted to transmissions by the tags. Although both sub-frames are divided into time slots as in FIG. 1 timing diagram, the similarity is superficial. In FIG. 1, each time slot in the first sub-frame is devoted to a particular base station that broadcasts to all tags, whereas in FIG. 4 each time slot in the first sub-frame is devoted to transmission to a particular tag, as specified by information provided to tags during the beacon signal time slot. For example, the system might be designed to accommodate 256 tags, but the first sub-frame might have only 4 time slots. The beacon signal might specify that transmissions to tags 12, 22, 41, and 150 would take place and, accordingly, tag 12 would power up during the first time slot of the first sub-frame, tag 22 would power up during the second time slot of the first sub-frame, tag 41 would power up during the third time slot of the first sub-frame and, finally, tag 150 would power up during the fourth time slot of the first sub-frame. All other tags would remain in their sleep states during the first sub-frame.

Asynchronous System

In an asynchronous system each RFID each tag transmits as it pleases or, more typically, each RFID has an internal clock and, based on that clock, the tag periodically wakes up, transmits information, and returns to sleep. Since these tags do no listening, it is not possible for base stations to inform a tag that information is sought to be communicated to it, although, as indicated above, one of the base stations is assigned the task of sending information to the tag (when such information needs to be communicated to the tag).

This problem is overcome by, for example, having each tag follow each transmission with a short period during which the tag remain powered up and ready to accept information that may be transmitted from a base-station. That additional short period may be fixed in duration, or sensitive to whether information is being received. For the latter embodiment, if information is not being received by the tag immediately following its transmission then the tag immediately returns to its sleep mode, before the duration of the short period expires. Otherwise, it continues to accept the incoming transmission.

If the duration of the listening period is fixed, then a base station is constrained to transmit only information that fits within the listening interval's fixed duration. If the information that needs to be communicated requires more time, then the information can be broken into chunks, as disclosed above in connection with synchronous systems. Alternatively, following a transmission a tag can stay powered up to determine whether a base station is transmitting to it and, if so, remain powered up until the transmission is completed. This approach is, of course, simpler, but it may increase the burden when a collision occurs.

Indeed, the main disadvantage of asynchronous systems is collisions that can occur in the course of tags transmitting information and in the course of tags receiving information. Those collisions are caused by other tags that transmit information without regard to whether the transmission medium is unoccupied. If such a collision occurs in the course of the tag transmitting information, it is possible to ignore the collision because the tag will transmit the same information to the base stations in the next frame and, therefore, the information will eventually be received. All that is needed is for the information transmitted by the tag having an embedded code (e.g. a CRC code) that allows a receiving base station to know whether it received a bona fide message or a corrupted message. However, if such a collision occurs in the course of transmitting information to the tag, the situation is somewhat different. There is no inherent need for a base station to retransmit information that had been properly received and, therefore, it is generally desirable to know if and when a collision does occur. In accord with the principles disclosed herein, the information transmitted by the tag includes an acknowledgement as to whether the transmission to the tag was successful. Of course, the information sent by the base station needs to include a code that allows a tag to determine whether it successfully received a transmission. If the transmission was not successful, the base station repeats the transmission the next time the tag wakes up, transmits information, and enters a listening period. It is noted that the tags not only operate asynchronously from each other but, advantageously, they operate with sleep intervals that are not of constant value; e.g., pseudorandom in duration.

Figure 5:
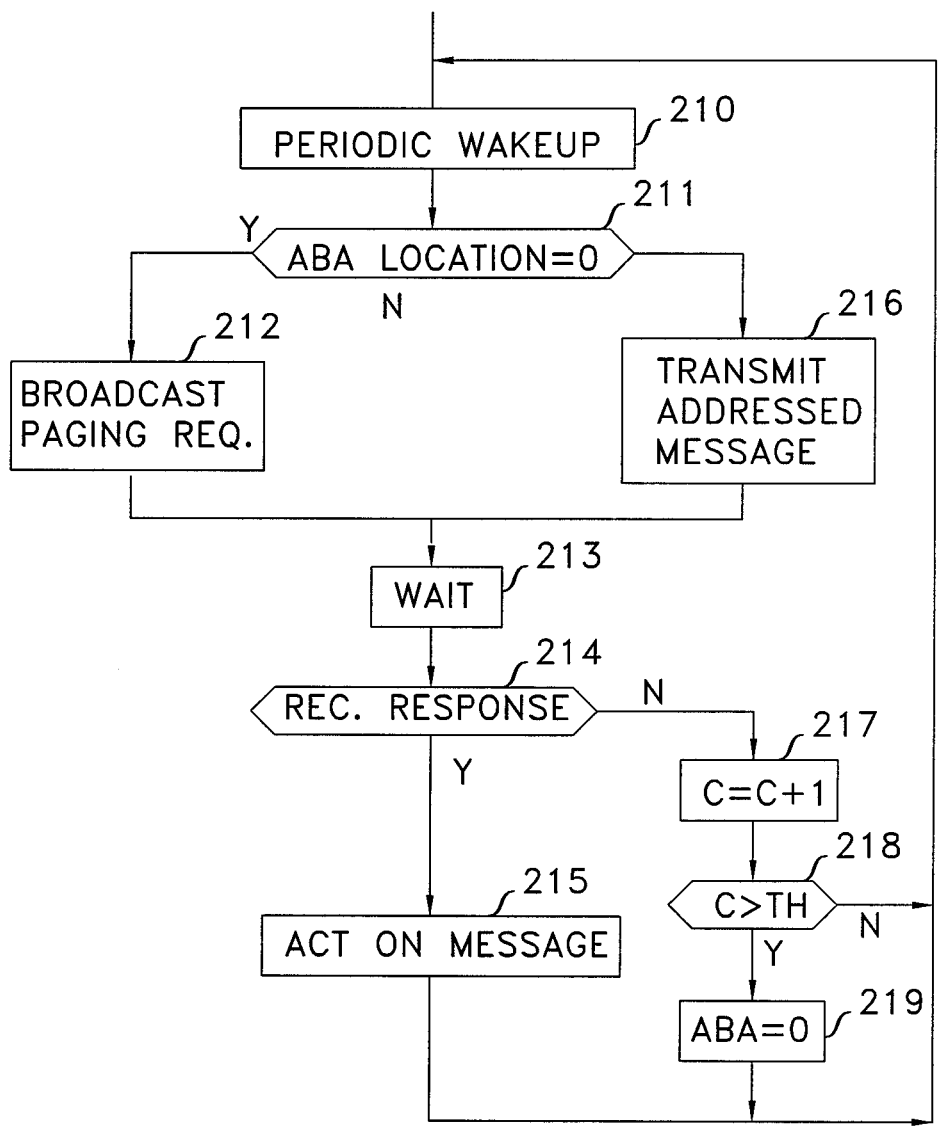
FIG. 5 presents a flowchart of the process by which tags interact with the network.

The following describes a method, depicted in FIG. 5, for building up and maintaining the FIG. 2 network as tags are introduced into the network and move about within the geographical expanse of the network.

As disclosed above, the network and the tags operate asynchronously. That is, each tag has its own internal clock, most of the time it is asleep, but periodically (e.g., every 3 seconds) it wakes up and transmits a packet. A base station of the FIG. 2 network responds, and that is how the tags intercommunicate with the FIG. 2 network of base stations and a controller (processor 110). The packet sent by a tag may be an Information packet or a Paging Request packet (described in more detail below), and the packet sent by a base station is an acknowledgement (ACK) packet.

In a first embodiment, when the tag wakes up, it transmits a packet, thereafter waits for a short time for an ACK packet, and returns to sleep. The tag's response to the receipt or non-receipt of the ACK packet takes place the next time the tag wakes up. In a second embodiment, after transmitting a packet the tag also waits for a short time for an ACK packet, but returns to sleep only if the ACK packet is received. Otherwise, it retransmits the sent packet. The following disclosure pertains to the first embodiment, but it should be realized that the second embodiment need not be markedly different in operation.

In accord with the principles disclosed herein the base stations do not maintain any lists or other relatively permanent storage for looking up an association between the base stations and the tags. Rather, each tag keeps track of the FIG. 2 network base station with which it is associated and, to that end, each tag maintains a memory location for the address of the associated base station. For convenience of exposition, it is assumed that a manufactured tag contains a zero in that location (hereinafter, the ABA location), though from the disclosure below an artisan would realize that this is not a requirement.

As depicted in FIG. 5, block 210, tag 150 periodically wakes up and ascertains in block 211 whether the value in its ABA location is 0. When a band new tag 150 is first introduced into the FIG. 2 network (e.g., into room 104) and it wakes up, the contents of its ABA location is zero and, consequently, block 211 passes control to block 212. Block 212 causes the tag to broadcast a Paging Request packet. The Paging Request packet minimally includes a field that characterizes the message as a broadcast message (such as an empty addressee field), and a field that contains the tag's unique ID.

Each base station that receives a Paging Request packet determines the packet's signal strength (RSSI level), creates a Reporting message that includes the base station's own address, the tag's ID and the determined RSSI level, and sends the Reporting message to the controller, i.e., processor 110. Illustratively, each base station communicates with processor 110 periodically (e.g., every 2 seconds) to send all Reporting messages and to receive messages from processor 110.

Thus, in response to the Paging Request packet that was broadcasted by tag 150, a number of the base stations that receive the broadcasted packet send a Reporting message to processor 110. Processor 110 extracts the information that is contained in the Reporting messages and, relative to Paging Request packet originating with tag 150, processor 110 determines the base station that ought to be communicating with tag 150. This determination is made based on the RSSI level of the various received Paging Request messages. Illustratively, when tag 150 is first introduced into room 104, the Paging Request packet that base station 114 receives most likely has the highest RSSI level, and the reporting of this information to processor 110 causes processor 110 to associate tag 150 with base station 114.

When the determination by processor 110 is reached, processor 110 sends a message that is addressed to base station 114, directing it to send an ACK packet to tag 150, where the ACK packet identifies base station 114. However, the time required to (1) communicate from the base stations to processor 110, (2) identify a chosen base station within processor 110, and (3) communicate a message to the chosen base station, is longer than the wait time that follows a tag's transmission. Therefore, following the first broadcast by tag 150 of a Paging Request packet no ACK packet is returned to tag 150. Therefore, in this embodiment, the directive from processor 110 to base station 114 to respond to messages from tag 110 is temporarily maintained, such as for one wake/sleep cycle of the tags, for the purpose of responding to a Paging Request packet. This is short-term storage is dubbed herein as BnB-T (broadcast to non-broadcast transition) storage.

Returning to FIG. 5, control passes from block 212 to blocks 213 and 214, and, as indicated above, in accord with the first embodiment no ACK message is returned following the first Paging Request message; so control passes to block 217.

In accord with the FIG. 5 method, when a tag sends out an Information packet and it fails to receive an ACK message, it retries, but only a chosen number of times before it assumes that it lost communication with the base station with to which the packet is addressed, at which point it sets the contents of the ABA address to 0, which in turn causes the tag to send out Paging Request packets. That chosen number of times is the integer TH. For sake of simplicity, the FIG. 5 method employs the same approach even when the packet that the tag sent out (and to which no ACK packet was received) is a Paging Request packet. Thus, when tag 150 broadcasts the first Paging Request packet that is received by one or more base stations of the FIG. 2 network and which resulted in no ACK packet being sent (and received), control passes through elements 217, 218 and 219 back to block 210. Elements 217 and 218 consider a variable C, which is reset to zero by block 215. Each time block 217 is reached, variable C is incremented by 1 and tested in block 218 to determine whether it reached the threshold, TH. If so, the content of the ABA location is reset to 0 in block 210. Control returns to block 210 either from block 219 or directly from block 218.

The next time tag 150 wakes up and broadcasts a Paging Request packet, base station 114 sends an ACK packet immediately after receiving the broadcast message and, therefore, control passes from block 214 of FIG. 5 to block 215. The ACK packet sent by base station 114 identifies the address of base station 114, and responsive to this ACK packet tag 150 stores the address of base station 114 in its ABA location, and returns control to block 210 (assuming that the ACK packet did not have any other directive to tag 150).

The next time tag 150 wakes up, the ABA location contains an address other than 0 (i.e., the address of base station 114), and control passes from block 211 to block 216, where tag 150 sends out an Information packet that is addressed to the base station identified by the contents of the ABA location; that is, to base station 114. Control passes to block 213 and thereafter to block 214.

Base station 114 receives the Information packet, and because the packet is addressed to it, base station 114 responds to the source of the packet (i.e., to tag 150) immediately following receipt of the Information packet, and control passes to block 215, and thence to block 210.

The method described above cycles through blocks 210, 211, 216, 213, 214, and 215 each time tag 150 wakes up. With each Information packet that tag 150 addresses to base station 114 it can send information to the controller, such as information about its exact location, information about its status, etc. Correspondingly, the controller (processor 110) can forward a directive to base station 114 to include in its next ACK packet whatever information processor 110 wishes to communicate to tag 150.

This cycling continues until tag 150 receives no ACK packets which, in accord with one embodiment, occurs when tag 150 moves outside the range of base station 114. Thereupon, control passes from block 214 to block 217. Block 217 increments variable C by 1 and, as described above, control passes to clock 218 and thence to block 210. This is repeated until variable C exceeds TH, at which point control passes to block 219, the contents of the ABA location is set to zero, control returns to block 210, and block 211 which follows passes control to block 212 for broadcasting a new Paging Request packet.

When tag 150 is outside the range of base station 114 but within the range of other base stations, the broadcasted Paging Request packet is received by those other base stations, and the above-described process repeats.

As described above, all base stations that receive broadcast Paging Request packets determine the RSSI level of the received packets and communicate that information to the central controller. Based on the received RSSI levels information the central controller chooses the base station that ought to communicate with the tags that broadcasted the Paging Request packet. In accord with another embodiment, all packets that are received by a base station, regardless of whether those packets are addressed to those base stations or not, have their respective RSSI levels determined and communicated to the central controller. Based on the RSSI levels information of a given message that was sent by a tag and received by a number of base stations, the central controller may decide to reassign the communication responsibility for that tag. Thus, in accord with this embodiment, even before tag 150 loses contact with base station 114, processor 110 might notice that tag 150 presents a stronger signal to, for example, base station 113, and will direct base station 113 to respond to tag 150 Information packets (rescinding the corresponding obligation of base station 114). In this manner, tag 150 can continue to communicate Information packets to processor 110, albeit via base station 113 rather than via base station 114, without needing to broadcast Paging Request packets. The computation burden that this embodiment levies on the base stations and on processor 110 is larger, of course.

It may be important in passing that the notion of a broadcast packet is opposite to the notion of a directed, or addressed, packet. An addressed packet is aimed to be received and utilized by one or a number of specific recipients. Such a packet might also be received and employed by unintended recipients. A broadcast packet, in contradistinction, is aimed at any and all devices that can, or choose to, receive and utilize the packet.

The invention claimed is:

1. A system comprising:
a controller
a plurality of base stations; and
a plurality of tags that most of the time are in a powered-down mode and are repetitively powered up to transmit a packet and to receive a packet, which tags consume significantly less power in the powered-down mode than in the powered-up mode,
where a base station of said base stations transmits a packet that is addressed to a tag of said tags in response to a packet A from said tag when said base station has a directive from said controller to transmit to said tag, as well as in response to said packet A when said packet A is addressed to the base station, without regard to whether said base station has a directive to transmit packets to said tag.

2. The system of claim 1 where
said controller selects said base station for said tag based on a packet B that is transmitted by said tag prior to said tag transmitting said packet A and is received by a plurality of base stations, which base stations report to said controller on received signal strength levels of said packet B, and
said controller selects said base station based on said signal strength levels and sends said directive to said base station.

3. The system of claim 2 where said packet A is a data packet, and said packet B is a broadcast packet.

4. The system of claim 1 where the tags operate asynchronously of each other.

5. The system of claim 4 where:
a tag, following a period of transmission of a broadcast packet or an addressed packet, remains in powered-up mode for a preselected period of time, following which said tag switches to its powered-down mode, to determine whether a packet that is addressed to the tag is being received from a base station, and
if during said preselected period of time the tag determines that it is receiving said packet, the tag extends duration of said preselected period of time to receive said packet in its entirety.

6. In a system that includes a controller, base stations, and a plurality of tags, a method executed in a base station of said base stations, comprising:
- (a) receiving from a tag of said tags a broadcast packet that identifies the tag;
- (b) responsive to said receiving, developing a measure of received signal power of said packet, and sending a message that informs said controller of receipt of identity of said tag that is contained in the received packet, and received signal power of the received packet;
- (c) receiving from said controller a directive to respond to packets received from said tag;
- (d) transmitting a packet to said tag in response to a received data packet from said tag when in possession of said directive;
- (e) transmitting a packet to said tag in response to a received packet that is addressed to said base station, without reference to said directive.

7. The method of claim 6 further comprising the steps of:
- (f) communicating a message to said controller that contains information derived from the packet received in step (d); and
- (g) including in the packet transmitted in step (e) information provided by said controller.

8. The method of claim 6, further performing step (b) in response to receiving a broadcast packet from any tag, and in response to receiving an addressed packet, whether the addressed packet is addressed to said base station or to other than said base station.

9. In a system that includes a controller, base stations, and a plurality of tags, a method executed in a tag of said tags, comprising:
- (a) responsive to a clock that cycles at a preselected rate, switching from a powered-down mode to a powered-up mode;
- (b) if a preselected location in a memory module of said tag contains a valid address of a base station, transmitting a packet having a destination address that is the address contained in said preselected location, and source address that is an identifier of said tag;
- (c) for a preselect duration following the packet transmitted by step (b), after which said tag switches to said powered-down mode, observing whether a packet is being transmitted that is addressed to said tag;
- (d) if step (c) observes that a packet is being transmitted that is addressed to said tag, extending said preselected duration to achieve complete reception of said packet;
- (e) said tag acting on information contained in the completely received packet; and
- (f) if step (c) fails to observe that a packet is being transmitted that is addressed to said tag, removing said valid address from said preselected location in said memory module pursuant to a preselected algorithm.

10. The method of claim 9 further comprising the steps of
- (g) if, following step (a) said preselected memory location has no valid address, said tag transmits a broadcast message which has no specified destination address;
- (h) in response to transmitting said broadcast message, receiving a packet that identifies an address of a base station; and
- (i) storing said address of a base station in said preselected location.

* * * * *